(12) United States Patent
Cattaneo

(10) Patent No.: US 11,732,739 B2
(45) Date of Patent: Aug. 22, 2023

(54) BARREL FOR A BARREL JOINT FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 637 days.

(21) Appl. No.: 16/065,805

(22) PCT Filed: Feb. 24, 2017

(86) PCT No.: PCT/EP2017/054292
§ 371 (c)(1),
(2) Date: Jun. 23, 2018

(87) PCT Pub. No.: WO2017/153183
PCT Pub. Date: Sep. 14, 2017

(65) Prior Publication Data
US 2018/0372137 A1    Dec. 27, 2018

(30) Foreign Application Priority Data
Mar. 7, 2016  (IT) .................. 102016000023329

(51) Int. Cl.
*F16B 12/20* (2006.01)
*F16B 12/46* (2006.01)
*A47B 47/04* (2006.01)

(52) U.S. Cl.
CPC ........ *F16B 12/2009* (2013.01); *A47B 47/042* (2013.01); *F16B 12/2036* (2013.01); *F16B 12/2063* (2013.01); *F16B 12/46* (2013.01); *F16B 2012/2018* (2013.01)

(58) Field of Classification Search
CPC .... F16B 5/008; F16B 5/0614; F16B 12/2009; F16B 12/2027; F16B 12/2036; F16B 12/2054; F16B 12/2063; F16B 2012/2081; A47B 96/027; A47B 96/066; A47B 47/042; Y10T 403/4602; Y10T 403/553; Y10T 403/556; Y10T 403/7096; Y10T 403/73
USPC .................... 403/DIG. 10, DIG. 12
See application file for complete search history.

(56) References Cited

U.S. PATENT DOCUMENTS

| | | | |
|---|---|---|---|
| 899,211 A | 8/1908 | Eastman | |
| 3,264,019 A * | 8/1966 | Houvener | F16B 7/18 52/127.12 |
| 5,292,095 A * | 3/1994 | Cattaneo | A47B 91/028 248/188.4 |
| 5,743,670 A * | 4/1998 | Ader | E04B 1/6137 403/11 |
| 9,388,837 B1 * | 7/2016 | Hanley | F16B 7/1463 |

(Continued)

FOREIGN PATENT DOCUMENTS

| | | |
|---|---|---|
| DE | 2748272 | 5/1979 |
| DE | 3145825 | 6/1982 |

(Continued)

*Primary Examiner* — Amber R Anderson
*Assistant Examiner* — Zachary A Hall
(74) *Attorney, Agent, or Firm* — Themis Law

(57) ABSTRACT

A barrel for a barrel joint for parts of furniture and furnishing items includes a hollow cylindrical body containing a blocking element and having at least one hole on one of its side surfaces for the passage of a tip of a tool that actuates the blocking element, the hollow cylindrical body also having at least another hole for receiving a pin of the barrel joint.

4 Claims, 6 Drawing Sheets

(56) References Cited

U.S. PATENT DOCUMENTS

| | | | |
|---|---|---|---|
| 10,034,542 B2 * | 7/2018 | Giovannetti | F16B 12/2027 |
| 10,087,971 B1 * | 10/2018 | Bergan | F16B 23/0061 |
| 2004/0208690 A1 | 10/2004 | Mauri | |
| 2005/0084326 A1 * | 4/2005 | Costa Claver | F16B 21/125 |
| | | | 403/328 |

FOREIGN PATENT DOCUMENTS

| | | | | |
|---|---|---|---|---|
| DE | 202005001451 U1 * | 4/2005 | | A47B 96/024 |
| EP | 0180965 | 5/1986 | | |
| EP | 733322 A1 * | 9/1996 | | A47B 91/028 |
| EP | 1469206 | 10/2004 | | |
| EP | 1798424 A1 * | 6/2007 | | F16B 12/2063 |
| EP | 2705775 A1 * | 3/2014 | | A47B 96/066 |
| EP | 2808565 A1 * | 12/2014 | | A47B 96/066 |
| EP | 3064089 | 7/2016 | | |
| FR | 1331299 A * | 6/1963 | | F16B 5/06 |
| GB | 2039339 | 8/1980 | | |
| JP | H0649814 | 7/1994 | | |
| LU | 37757 | 10/1959 | | |
| LU | 37757 | 12/1959 | | |
| WO | WO-2005115199 A1 * | 12/2005 | | A47B 91/028 |
| WO | 2008076089 | 12/2007 | | |
| WO | WO-2009056935 A1 * | 5/2009 | | A47C 3/30 |
| WO | WO-2012048849 A1 * | 4/2012 | | A47B 95/008 |
| WO | 2017005632 | 1/2017 | | |

* cited by examiner

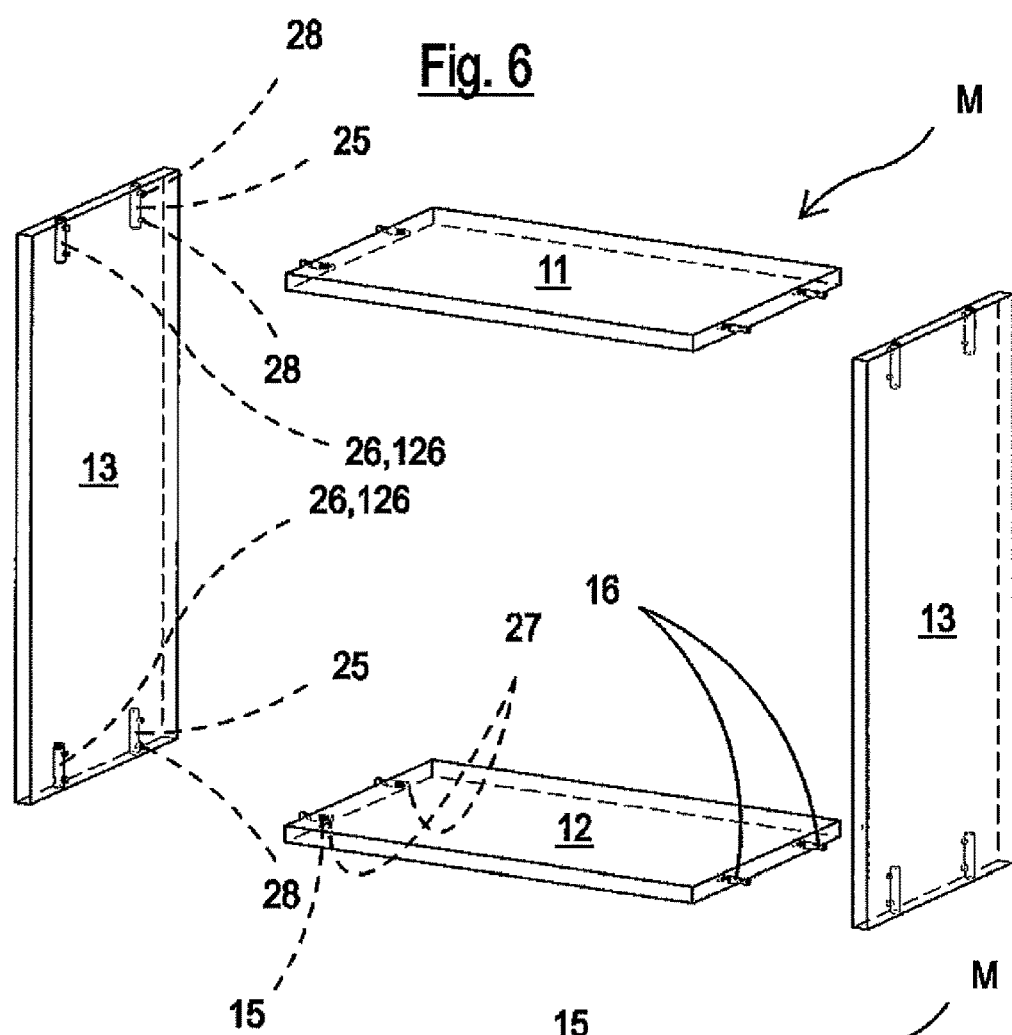
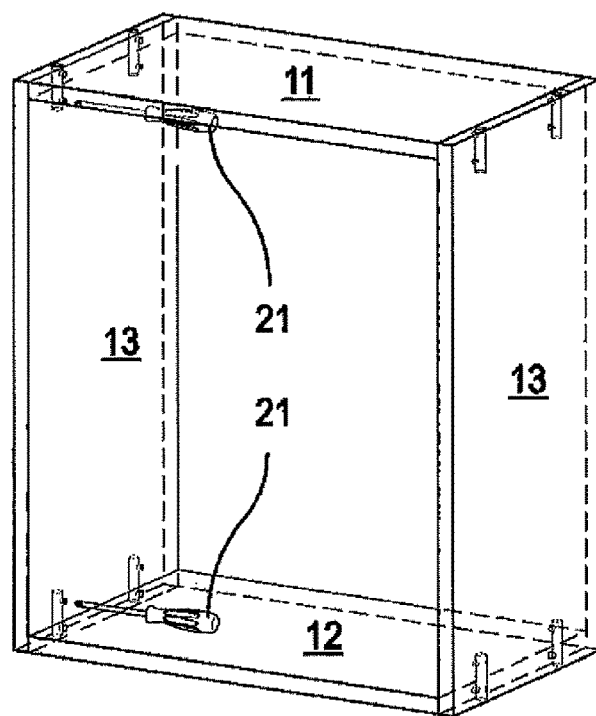

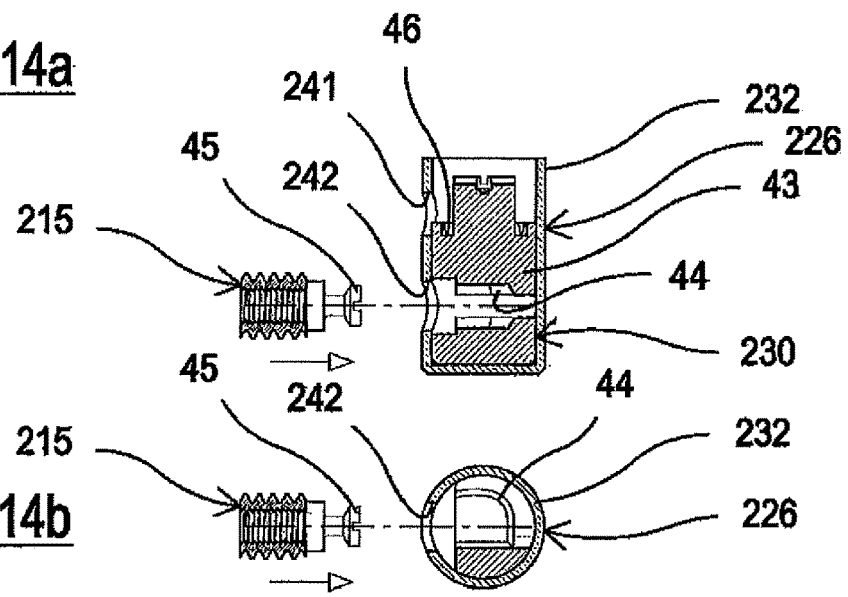
Fig. 14a
Fig. 14b
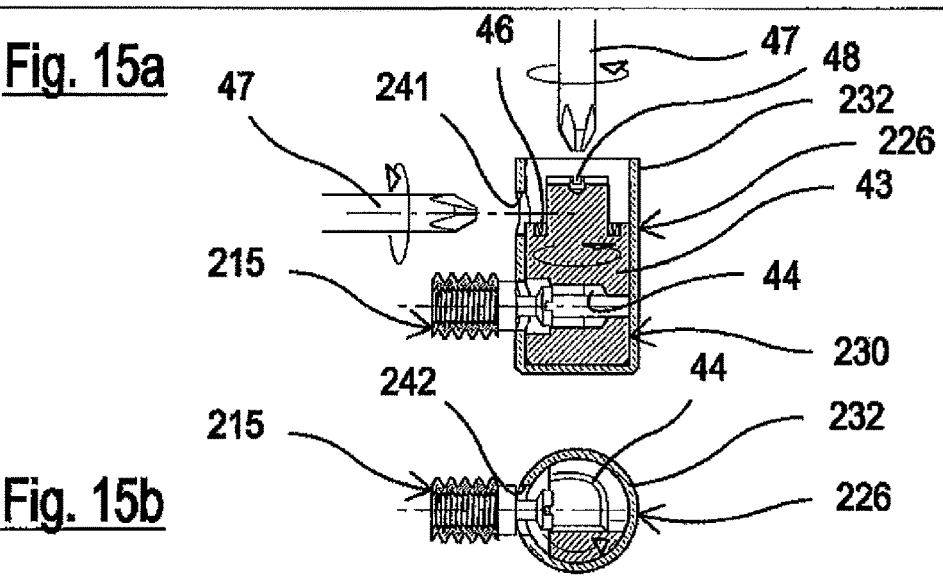
Fig. 15a
Fig. 15b
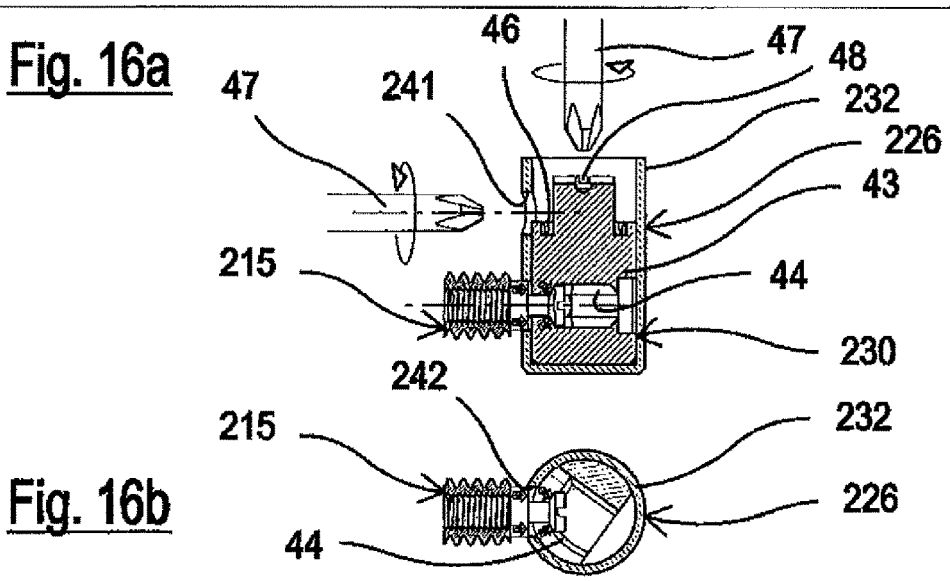
Fig. 16a
Fig. 16b

BARREL FOR A BARREL JOINT FOR PARTS OF FURNITURE AND FURNISHING ITEMS The present invention relates to a barrel for a barrel joint for parts of furniture and furnishing items.

The joining between two panels, for example between a shoulder of a piece of furniture and a base, shelf or top, in the furniture and furnishing industry, is currently effected by positioning a pin screwed into a hole of the shoulder and a barrel inserted in a hole formed in the base, shelf or top of the furniture.

In order to position the barrel in this way, a relatively wide hole must be produced in the base, shelf or top of the furniture, which receives the barrel that houses a grub screw in its threaded portion. The hole thus produced must also be covered by a cap to restore the aesthetic appearance of the parts involved. Furthermore, the barrel must not be longer than a certain size due to the thickness of the base, shelf or top in which it is positioned.

FIGS. 1 to 5 show a known solution of this type designed for connecting a top 11 and/or a base 12 of a piece of furniture M and two side shoulders 13 of the same to provide the desired joint.

In the known solution illustrated, horizontal holings 14 must be provided, having a smaller size, produced in the shoulders 13, which receive a threaded end 15 of a pin 16. Vertical holings 17 must also be provided, having a much larger size, produced in the visible part in both the base or shelf 12 and in the top 11 of the furniture M, to receive a barrel 19. Additional horizontal holings 20 must also be provided, which intersect the above-mentioned vertical holes 17, to receive the threaded end 15 of the pin 16.

It can be easily understood that the holings 17 that receive the barrel 19 must also be covered by specific caps, not shown, in order to restore the aesthetic appearance of the finished furniture.

The blockage of a joint of this type, after positioning the pins 16 in the shoulders 13 and the barrels 19 in the base 12 or top 11, is effected using a common screwdriver 21.

As shown in the figures in fact, it is necessary to act in the direction perpendicular to the joint as appears in the constraining and blocking phases illustrated in FIGS. 3 to 5. The screwdriver 21 passes into the holing 17, which is used for positioning the barrel 19, and blocks a threaded grub screw 22, screwing according to the arrow 23. It can in fact be observed that the grub screw 22 is positioned in an internal threading 24 of the barrel 19 which has an extremely short body and a considerable diameter. The cap (not shown) that covers the holing 17, once a stable joining between the parts has been obtained, consequently as the same large dimensions.

It should also be noted that a cap of this type is positioned on the upper surface of the base or shelf 12 thus creating an obstacle or source of disturbance for possible objects that are arranged on the same.

DE 3145825 describes a barrel for a barrel joint for parts of furniture and furnishing items according to the preamble of claim 1.

DE 2748272, LU 37757 and EP 1469206 illustrate other examples of a barrel for a barrel joint for parts of furniture and furnishing items.

The general objective of the present invention is therefore to provide a barrel for a barrel joint for parts of furniture and furnishing items, such as a shoulder, a base, a top and/or a shelf, capable of solving the drawbacks of the known art indicated above in an extremely simple, economical and particularly functional manner.

A further objective of the present invention is therefore to provide a barrel for a barrel joint which, in addition to having minimum visibility on the part of an observer, and consequently a high aesthetical value, can be accessible from at least two sides also in the case of irremovable encumbrances positioned close to the base or shelf.

Another objective of the present invention is to provide a barrel for a joint between parts of furniture and furnishing items that allows insertion in a thickness of the single panel, without weakening it.

The structural and functional characteristics of the present invention and its advantages with respect to the known art will appear even more evident from the following description, referring to the enclosed schematic drawings, which show embodiment examples of the same invention having the same innovative concept. In the drawings:

FIGS. 6 and 7 are respectively an exploded perspective view and an assembled view of a piece of furniture with barrels according to the present invention connected to pins forming stable joints between the parts of two shoulders of a piece of furniture and a base and top respectively;

FIGS. 14a to 16b are sectional views according to two perpendicular directions of yet another barrel according to the invention when it is connected to a pin forming the joints illustrated in the previous FIGS. 6 and 7.

Figure 1:
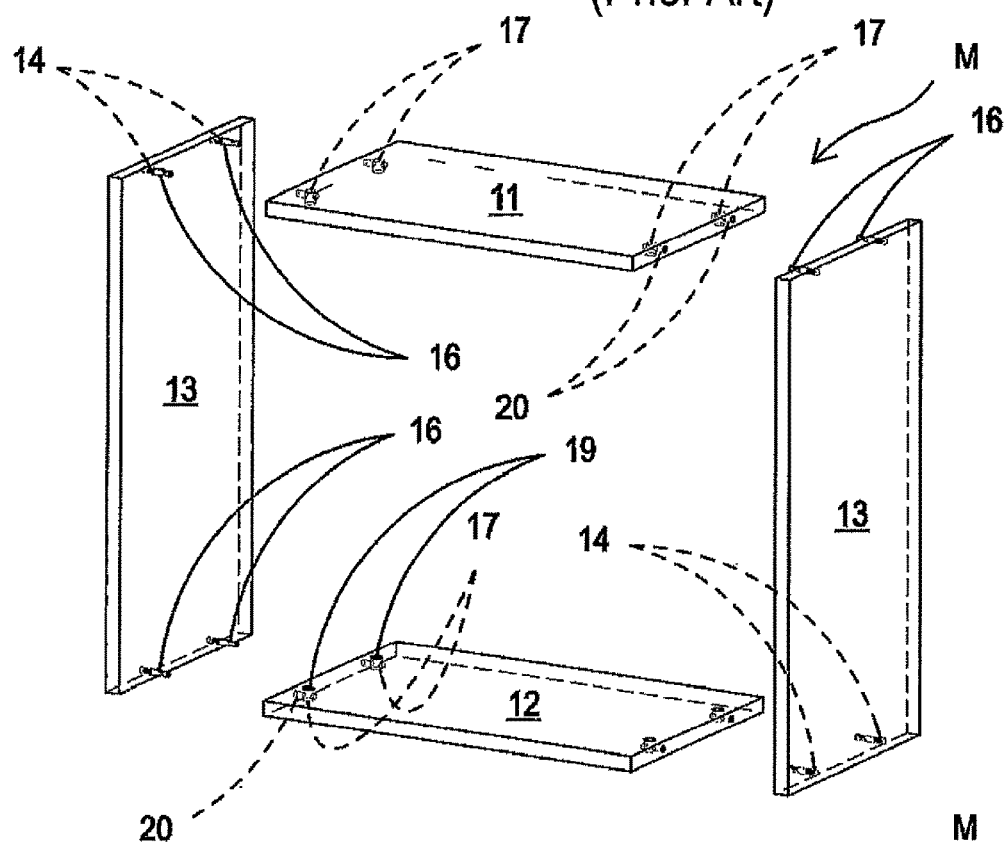
FIGS. 1 and 2 are respectively an exploded perspective view and an assembled view of a piece of furniture with barrels and pins of the known art positioned between two shoulders of a piece of furniture connected by a base and by a top forming stable joints between the parts.
Figure 2:
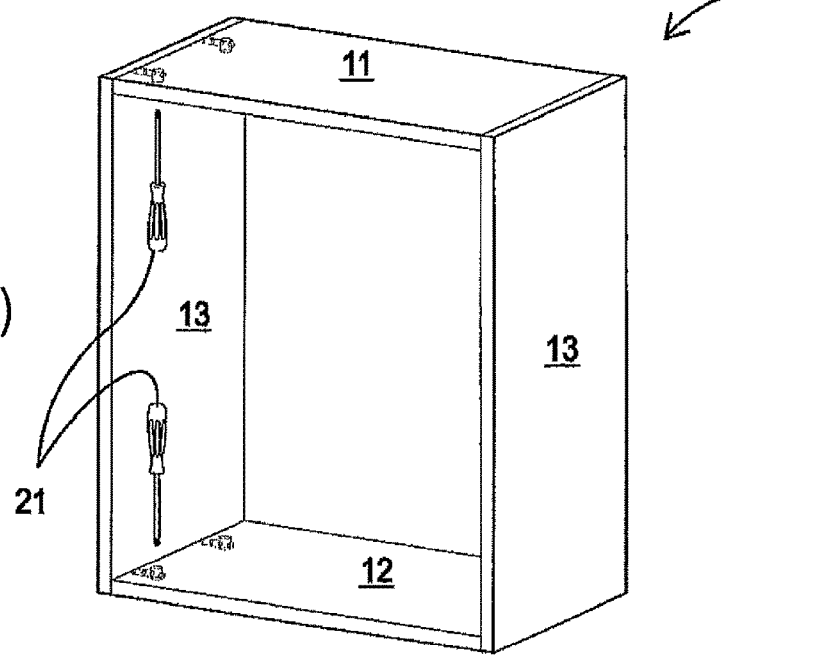
Figure 3:
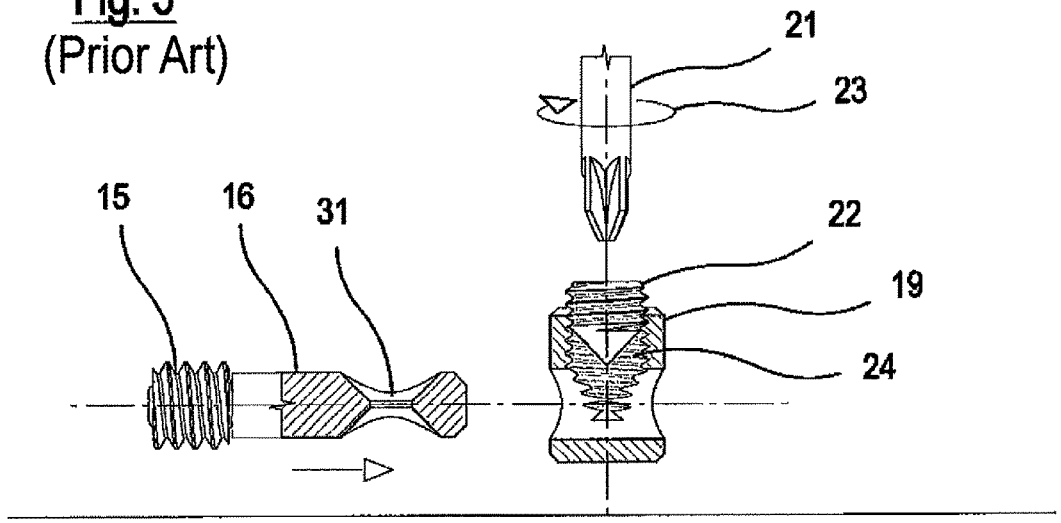
FIGS. 3 to 5 are sectional views of a barrel of the known art when it is connected to a pin forming the joints of a piece of furniture illustrated in the previous FIGS. 1 and 2.
Figure 4:
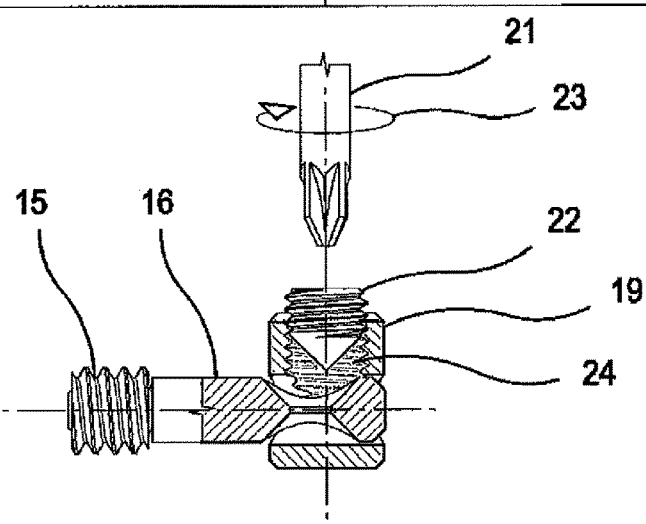
Figure 5:
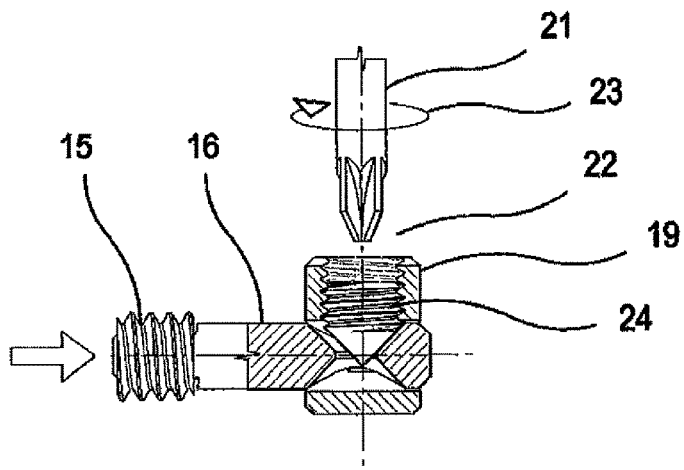

With reference first of all to FIGS. 6 and 7, these show a piece of furniture M comprising a top 11 and a base or shelf 12 suitable for being positioned between two side shoulders 13 by means of a series of four joints which provide a barrel for a barrel joint for parts of furniture and furnishing items according to the present invention.

For the positioning of this type of barrel joint, which provides a barrel according to the present invention, vertical holings 25 are provided, formed in the thickness of the shoulders 13, which receive a barrel 26, 126 according to the invention. Horizontal holings 27 must also be provided, having a much smaller size, also formed in the thickness in both the base or shelf 12 and in the top 11 of the furniture M, for receiving a pin 15.

Additional horizontal holings 28 must also be provided in the shoulders 13, which intersect the above-mentioned vertical holes 25, which are used for acting on a blocking element of the barrel joint. A blocking element of this type can be produced by means of a simple grub screw 29 (FIGS. 11 to 13) or by means of a blocking mechanism 30 (FIG. 8 to 10) or 230 (FIGS. 14a to 16b) inside a barrel 26, 126, 226. Both the grub screw 29 and the blocking mechanism 30, 230 are engaged in a part of the same with a housing 31 present for this purpose on a pin 15, 215.

Figure 8:
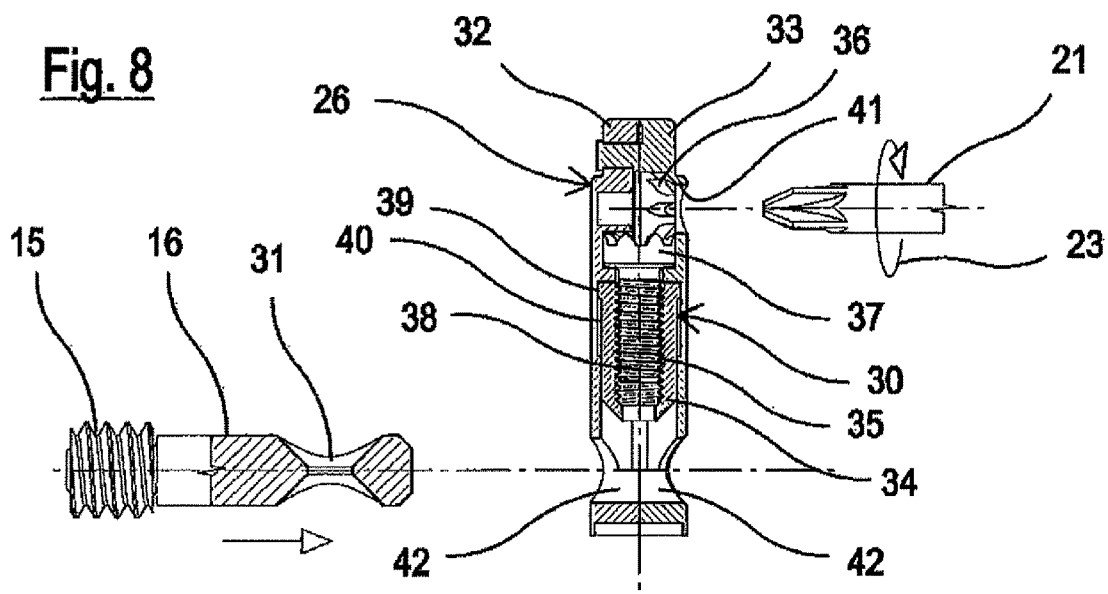
FIGS. 8 to 10 are sectional views of a barrel according to the invention when it is connected to a pin forming the joints illustrated in the previous FIGS. 6 and 7.
Figure 9:
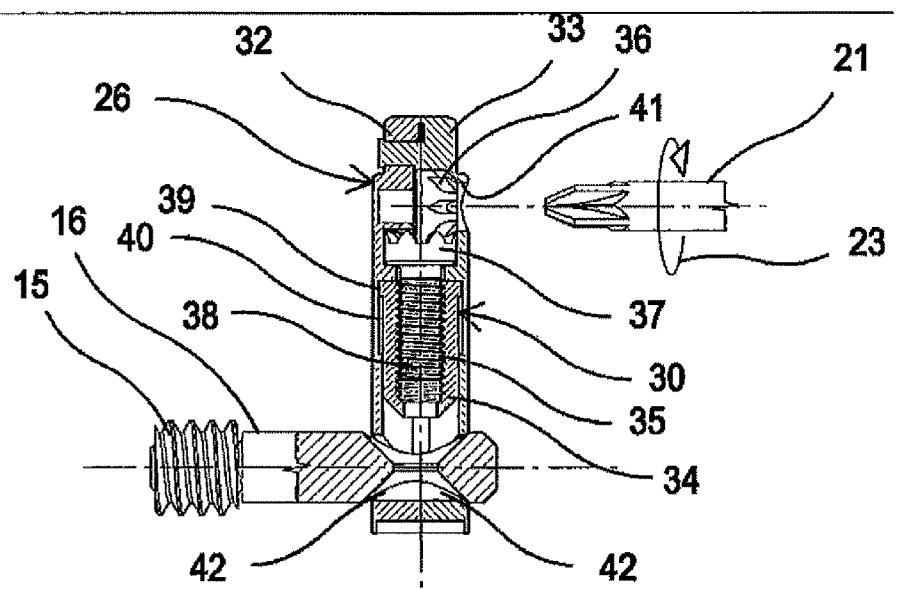
Figure 10:
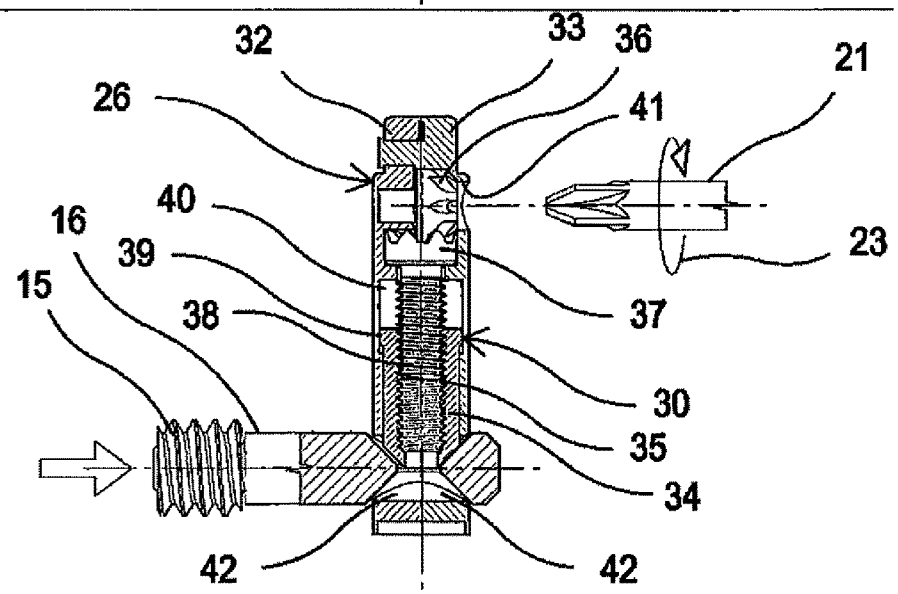

FIGS. 8 to 10 show a barrel 26 according to the invention in a similar barrel joint.

The barrel 26 comprises a pair of half-shells 32, 33, that can be coupled with each other, to form a hollow cylindrical casing containing the blocking mechanism 30. In particular, a grub screw 34, internally threaded in 35 in a hole coaxial to the same, is caused to slide in part of said casing, which comprises the two half-shells 32, 33.

A bevel gear comprising a pinion 36 and a toothed crown 37 allows the translation of the grub screw 34. More specifically, the pinion 36 is rotatable inside a housing formed in the pair of half-shells 32, 33, whereas the toothed crown 37 is formed as the head of a threaded screw 38 which is engaged in the internal threading 35 of the grub screw 34. The grub screw 34, as shown for example in the figures, can be provided with blocking means against rotation which allow the translation of the same grub screw 34, preventing its rotation. The means can consist, for example, of radial protrusions 39 of the grub screw 34 which are coupled inside vertical complementary seats 40 formed in at least one of the half-shells 32, 33.

This blocking mechanism is driven from the outside by the star tip of a screwdriver 21.

It should be noted that one of the half-shells, for example that indicated with 33, provides, on the side surface, a side hole 41 for access inside the casing 32, 33. The tip of the screwdriver 21 is passed from said side hole 41. Furthermore, the two shells 32, 33 provide two further holes 42, aligned in the two half-shells 32, 33, for receiving the pin 16.

The casing 32, 33, consequently provides at least one side hole 41 which is aligned with the respective horizontal holing 28, which, as already mentioned, is formed in the shoulder 13.

FIGS. 8 to 10 show both the insertion of the pin 16 into the barrel 26 and also the blockage of the pin 16 by the movement of the grub screw 54 inside the barrel by means of the blocking mechanism 30.

Figure 11:
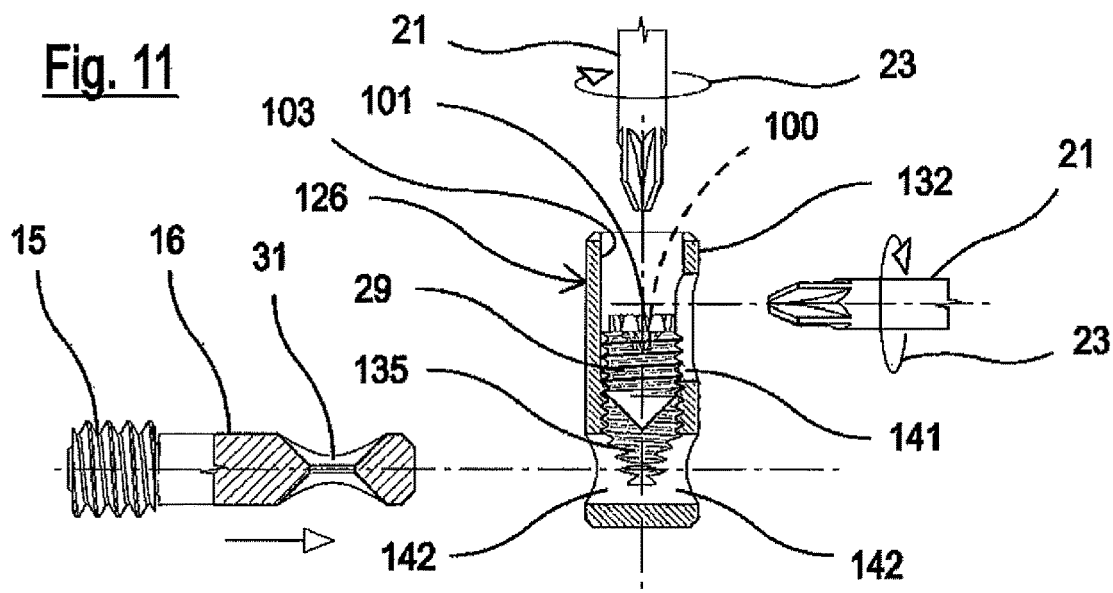
FIGS. 11 to 13 are sectional views of a further barrel according to the invention when it is connected to a pin forming the joints illustrated in the previous FIGS. 6 and 7.
Figure 12:
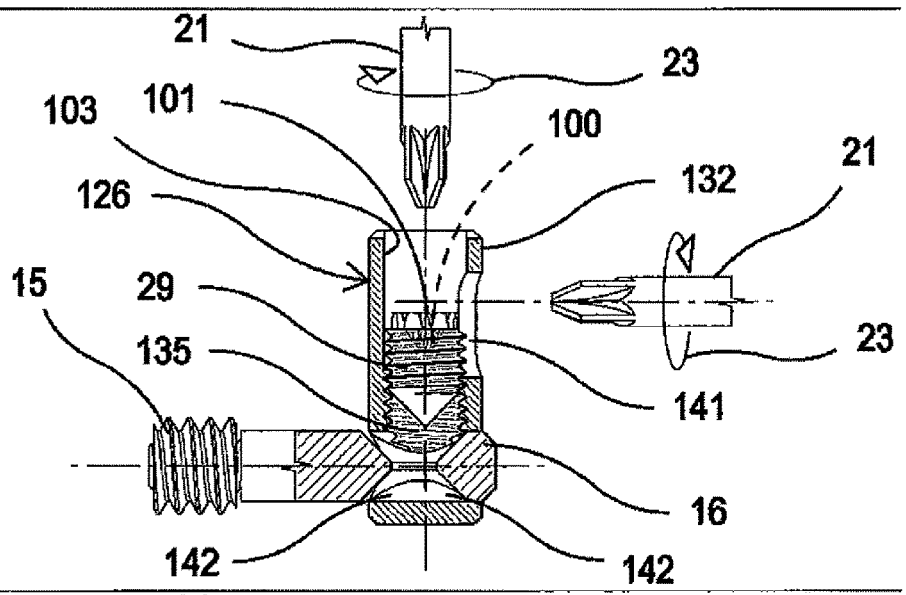
Figure 13:
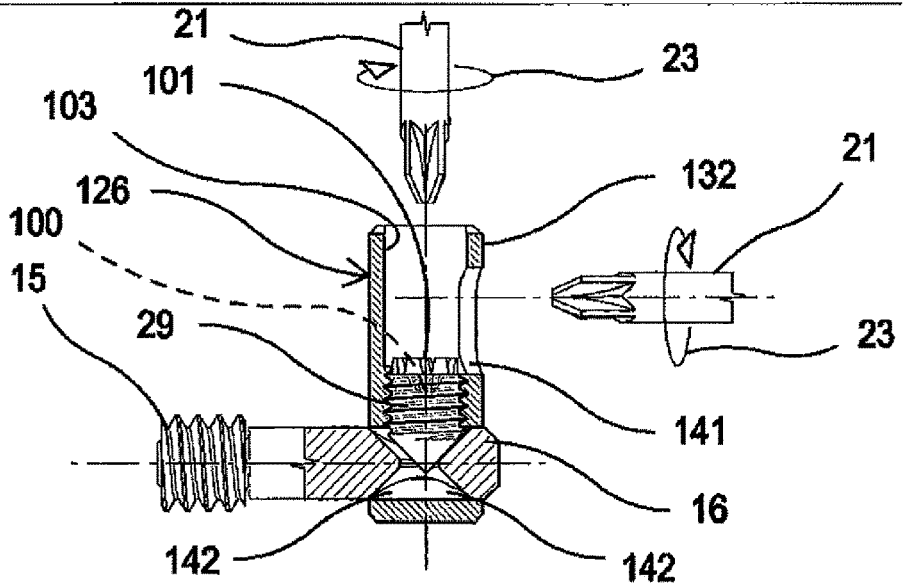

FIGS. 11 to 13 show a further example of a barrel for a barrel joint according to the present invention which applies the same innovative concept.

In the figures, a barrel 126 provides a body 132 having a cylindrical form, provided with an internal threading 135 in which the grub screw 29 is screwed. The body 132 also provides a side hole 141, from which a tip of a screwdriver 21 passes, and two further holes 142 aligned for receiving the pin 16.

The head of the grub screw 29 provides both a housing 100 for a tip of a screwdriver 21 and also a peripheral toothing 101 for collaborating with a tip of a screwdriver 21.

It can therefore be seen how, in this case, it is possible to act on the grub screw 29 in a first way, by passing, as in the previous example, from the side hole 141 in the body 132 of the barrel 126 and acting with the tip of the screwdriver 21 on the peripheral toothing 101 of the grub screw 29.

A further possibility is provided by the presence of an upper hole 103 in the body 132 of the barrel 126 which allows a tip of a screwdriver 21 to be inserted in the housing 100 of the grub screw 29 to rotate the same.

FIGS. 14a to 16b show a further example of a barrel for a barrel joint according to the invention which applies the same innovative concept.

In FIGS. 14a to 16b, a barrel 226 contains a blocking mechanism 230. The barrel 226 provides a hollow body 232 having a cylindrical form, in which a cylinder 43 is housed, which rotates in its interior. The cylinder 43 provides, in an intermediate portion, a cam 44 suitable for being engaged with a screw having an enlarged head 45 forming part of the pin 215.

The cam 44 of the cylinder 43 which, as already specified, is rotatable, is produced in the form of a curved wall which forms a toothing which extends upwards with a variable profile (FIG. 14b).

An upper portion of the cylinder 43 contains a perimetric toothing 46, embedded with respect to the side surface of the cylinder 43, which can be engaged by means of a star tip of a screwdriver 47 (only partially shown). Said toothing 46 forms actuation means for the rotation of the cam 44.

It should be noted, however, that a further activation means for the rotation is present, consisting of a seat 48 formed above the cylinder 43 suitable for receiving a star tip of a screwdriver 47 (only partially shown). Furthermore, the body 232 of the barrel 226 provides a side hole 241, from which the tip of the screwdriver 47 passes, and a further hole 242 from which the screw with an enlarged head 45 forming part of the pin 215, passes.

It can therefore be seen how, in this case, it is possible to act on the barrel 226 in a first way, by passing from the side hole 241 in the body 232 of the barrel 226 and acting with the tip of the screwdriver 47 on the peripheral perimetric toothing 46 of the cylinder 43.

A further possibility is provided by the presence of an upper opening in the body 232 of the barrel 226 which allows a tip of a screwdriver 47 to be inserted in the housing 48 of the cylinder 43 to rotate the same.

The advantages and innovative features have thus been shown, of a barrel for a barrel joint for parts of furniture and furnishing items according to the present invention.

The forms and structure for the production of a barrel for a barrel joint according to the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A connector assembly for joining parts of furniture and furnishing items comprising:
   a pin;
   a hollow cylindrical body having a single pinion through-hole defined in an upper portion of a side surface thereof, for passage of a tip of a tool, the hollow cylindrical body having closed end surfaces at opposing ends of the hollow cylindrical body and containing a blocking element disposed therein, said cylindrical body having, on the side surface, opposing pin through-holes extending through diametrically opposing portions of the side surface, having aligned longitudinal axes, and defined in a lower portion of the hollow cylindrical body for receiving the pin inserted therethrough from outside into the hollow cylindrical body,
   wherein said blocking element comprises:
   a grub screw disposed to slide in its entirety axially inside said hollow cylindrical body so as to contact said pin, said grub screw having an internal threading, and
   a threaded screw disposed inside said hollow cylindrical body and comprising a head, said threaded screw engaging said internal threading of said grub screw, and
   a pinion disposed inside said hollow cylindrical body and aligned with the pinion through-hole for actuating the head of the threaded screw, wherein said pinion is rotatable in a housing formed in said hollow cylindrical body, wherein the head of the threaded screw and said pinion form a bevel gear, wherein the pin is configured to extend perpendicularly from an end surface of a first panel and the hollow cylindrical body is configured to be received longitudinally within an end surface of a second panel, wherein the pin is inserted through the opposing pin openings in the cylindrical body and the bevel gear is actuated by the tool to rotate the pinion and the threaded screw and axially move the grub screw such that the grub screw engages the pin, wherein the engagement connects the pin and cylindrical body.

2. The connector assembly according to claim 1,
wherein said hollow cylindrical body comprises two half-shells adapted to be coupled with each other to form a hollow cylindrical casing containing said blocking element.

3. The connector assembly according to claim 2, wherein said bevel gear comprises the pinion and a toothed crown, wherein said toothed crown is shaped as the head of the threaded screw, and wherein said grub screw is configured to be blocked against rotation, so to have an axial translation.

4. The connector assembly according to claim 3, wherein said grub screw is configured to be blocked against rotation by radial protrusions of the grub screw, which are coupled inside complementary seats in said hollow cylindrical casing.

\* \* \* \* \*